US012586848B2

(12) United States Patent (10) Patent No.: US 12,586,848 B2
Minamibori (45) Date of Patent: Mar. 24, 2026

(54) PACKAGING MATERIAL FOR BATTERY

(71) Applicant: Resonac Packaging Corporation, Hikone (JP)

(72) Inventor: Yuji Minamibori, Isehara (JP)

(73) Assignee: Resonac Packaging Corporation, Hikone (JP)

( * ) Notice: Subject to any disclaimer, the term of this patent is extended or adjusted under 35 U.S.C. 154(b) by 124 days.

(21) Appl. No.: 17/406,082

(22) Filed: Aug. 19, 2021

(65) Prior Publication Data

US 2022/0059891 A1 Feb. 24, 2022

(30) Foreign Application Priority Data

Aug. 20, 2020 (JP) ................................. 2020-139411
Jul. 2, 2021 (JP) ................................. 2021-110499

(51) Int. Cl.
*H01M 50/193* (2021.01)
*B32B 27/08* (2006.01)
(Continued)

(52) U.S. Cl.
CPC ........... *H01M 50/193* (2021.01); *B32B 27/08* (2013.01); *B32B 27/327* (2013.01);
(Continued)

(58) Field of Classification Search
CPC ...... H01M 50/183–198; H01M 50/122; B32B 27/08; B32B 27/327
See application file for complete search history.

(56) References Cited

U.S. PATENT DOCUMENTS

2003/0180609 A1* 9/2003 Yamashita .......... H01M 50/186
429/185
2007/0082185 A1* 4/2007 Ikeno ..................... B32B 27/08
428/220
(Continued)

FOREIGN PATENT DOCUMENTS

JP 2004-130732 4/2004
JP 2017062872 A * 3/2017
(Continued)

OTHER PUBLICATIONS

Fedelich, "Application Handbook Thermal Analysis of Polymers Selected Applications Thermal Analysis",Jan. 1, 2013, XP055608279, Retrieved from the Internet: URL:https://www.mt.com/dam/LabDiv/guides-glen/ta-polymer/TA_Polymers_Selected_Apps_EN.pdf, [retrieved on Jul. 24, 2019], See Cite No. 6.
(Continued)

*Primary Examiner* — Haroon S. Sheikh
(74) *Attorney, Agent, or Firm* — MORI & WARD, LLP

(57) ABSTRACT

A packaging material for a battery includes a base material layer as an outer layer, a sealant layer as an inner layer, and a barrier layer provided between the base material layer and the sealant layer. The sealant layer is composed of a single layer or a multi-layer. The sealant layer includes a first sealant layer serving as an innermost layer made of a propylene-based resin containing an ethylene-propylene copolymer. In the ethylene-propylene copolymer, a ratio $Mw/Mn$ of a weight average molecular weight $Mw$ to a number average molecular weight $Mn$, measured by a gel permeation chromatography (GPC), is 1 to 7, a melt flow rate measured at 230° C. at a load of 2.16 kg based on JIS K7210 is 5 g/10 min to 30 g/10 min, and a melting point calculated by a differential scanning calorimetry analysis is 120° C. to 135° C.

10 Claims, 1 Drawing Sheet

(51) Int. Cl.

| | | |
|---|---|---|
| *B32B 27/32* | (2006.01) | |
| *H01M 50/122* | (2021.01) | |
| *H01M 50/195* | (2021.01) | |
| *H01M 50/198* | (2021.01) | |

(52) U.S. Cl.

CPC ....... *H01M 50/122* (2021.01); *H01M 50/195* (2021.01); *H01M 50/198* (2021.01); *B32B 2457/10* (2013.01)

(56) References Cited

U.S. PATENT DOCUMENTS

| | | | |
|---|---|---|---|
| 2014/0087241 A1 | 3/2014 | Kuramoto et al. | |
| 2017/0012250 A1* | 1/2017 | Kuramoto | B32B 15/085 |
| 2017/0092904 A1* | 3/2017 | Nakajima | H01M 50/119 |
| 2019/0143646 A1* | 5/2019 | Ogiwara | H01M 50/197 |
| | | | 428/458 |

FOREIGN PATENT DOCUMENTS

| | | | | |
|---|---|---|---|---|
| JP | 2018-060753 | A | † | 4/2018 |
| JP | 2018-060758 | A | † | 4/2018 |
| JP | 2018076127 | A | * | 5/2018 |
| JP | 2019-29300 | | | 2/2019 |
| JP | 6540871 | B1 | | 7/2019 |
| WO | WO-2021246472 | A1 | * | 12/2021 |

OTHER PUBLICATIONS

Thomas, "GPC/SEC Practical Tips and Tricks", Oct. 1, 2011, XP055608344, Retrieved from the Internet: URL:https://www.agilent.com/cs/library/slidepresentation/Public/GCC2011-Wksp_GPC_Tips-and-Tricks_Presentation.pdf, [retrieved on Jul. 24, 2019], See Cite No. 6.

Extended European Search Report for corresponding EP Application No. 21191644.0-1108, Jan. 21, 2022.

* cited by examiner
† cited by third party

PACKAGING MATERIAL FOR BATTERY

BACKGROUND OF THE INVENTION

Technical Field

The present invention relates to a packaging material for a battery and its related art, which is suitably used, for example, as a case of a secondary battery for automobiles, a stationary second battery, a second battery for notebook computers, mobile phones, or cameras, particularly as a case of a small portable lithium-ion secondary battery.

Background of the Invention

A power storage device typified by a lithium-ion battery uses a laminate-type packaging material in which a resin layer is bonded to both surfaces of an aluminum can or case. Therefore, it can be processed into a variety of shapes, and it can be thinner and lighter. In a power storage device using a laminate material as its packaging material, gases are generated by volatilization or the like of the electrolyte when the temperature in the battery rises as the capacity of the device increases. As a result, the internal pressure rises, which causes the case to expand and burst. Further, in a case where the generated gas is flammable, there is a risk of ignition. For this reason, a case of such a device is designed to gently release gases to prevent bursting (see Patent Documents 1 and 2).

Patent Document 1 discloses a preventive measure by a structure of a case. The structure of the case disclosed in Patent Document 1 is provided with a valve mechanism for reducing the pressure when the case inner pressure rises and a vent passage for directing the case inner gas to the valve mechanism.

Patent Document 2 discloses a preventive measure by a case material. The case material disclosed in Patent Document 2 includes a heat fusible resin layer (sealant layer) formed of a laminate material, the heat fusible resin layer being made of a resin having a melting peak temperature of 130° C. or less. With this configuration, in a case where it is exposed to a high-temperature environment, the battery is prevented from being expanded to gradually unseal the battery.

PRIOR ART DOCUMENT

Patent Document

Patent Document 1: Japanese Patent No. 6,540,871
Patent Document 2: Japanese Unexamined Patent Application Publication No. 2019-29300

SUMMARY OF THE INVENTION

Problems to be Solved by the Invention

However, the preventive measure described in Patent Document 1 requires an additional component, such as, e.g., a valve mechanism and a ventilation passage. Therefore, the material cost and the production cost are high. Further, in the laminate material described in Patent Document 2, the unsealing temperature is controlled by the melting peak temperature of the sealant layer. For this reason, in order to assuredly cause the unsealing of the case before the bursting, it is required to design such that the unsealing of the case is performed in a low-temperature region. In doing so, there is a possibility that the case is unsealed even at practical temperature at which no gases are generated.

Means for Solving the Problem

The present disclosure has been made in view of the above-described technical background. The present disclosure provides a packaging material for a battery in which the sealing strength drops at a temperature at which a flammable gas due to an electrolyte is generated to cause the unsealing of the case.

That is, the present invention has the configuration described in the following items [1] to [8].

[1] A packaging material for a battery, comprising:
a base material layer as an outer layer;
a sealant layer as an inner layer; and
a barrier layer provided between the base material layer and the sealant layer,
wherein the sealant layer is composed of a single layer or a multi-layer,
wherein the sealant layer includes a first sealant layer serving as an innermost layer made of a propylene-based resin containing an ethylene-propylene copolymer, and
wherein in the ethylene-propylene copolymer,
a ratio $Mw/Mn$ of a weight average molecular weight $Mw$ to a number average molecular weight $Mn$, measured by a gel permeation chromatography (GPC), is 1 to 7,
a melt flow rate measured at 230° C. at a load of 2.16 kg based on JIS K7210 is 5 g/10 min to 30 g/10 min, and
a melting point calculated by a differential scanning calorimetry analysis is 120° C. to 135° C.

[2] The packaging material for a battery as recited in the above-described Item [1],
wherein the ethylene-propylene copolymer is a metallocene catalyst-derived copolymer.

[3] The packaging material for a battery as recited in the above-described Item [1],
wherein the propylene-based resin is a mixture of an ethylene-propylene copolymer and polyethylene, and a content of the polyethylene in the mixture is 7 mass % to 20 mass %.

[4] The packaging material for a battery as recited the above-described Item [3],
wherein 70 mass % or more of the polyethylene is metallocene catalyst-derived polyethylene.

[5] The packaging material for a battery as recited in the above-described Item [1],
wherein the sealant layer is composed of a multi-layer in which a first sealant layer, a second sealant layer composed of one or more layers, and a third sealant layer are laminated in order from an inside of the packaging material toward a barrier layer side,
wherein the third sealant layer is made of an ethylene-propylene random copolymer, and
wherein a melt flow rate of a resin constituting at least one layer of the second sealant layer is smaller than a melt flow rate of the ethylene-propylene copolymer of the first sealant layer.

[6] A battery case comprising:
a pair of the packaging materials as recited in any of the above-described Items [1] to [5],
wherein the packaging materials are arranged with sealant layer sides thereof facing inward and edge portions of the packaging materials are heat-sealed to form a battery element chamber for accommodating a battery element.

[7] The battery case as described in the above-described Item [6], wherein a sealing strength of the edge portion of the battery element chamber is 60 N/15 mm or more at room temperature, 25 N/15 mm or more at 100° C., and 6 N/15 mm to 12 N/15 mm at 130° C.

[8] A battery comprising:

the battery case as recited in the above-described Item [6]; and a battery element accommodated in the battery element chamber of the battery case.

Effects of the Invention

In a packaging material for a battery as recited in the above-described Item [1], the first sealant layer of the sealant layer, which is the innermost layer, is made of a propylene-based resin containing an ethylene-propylene copolymer having a defined property. Therefore, the sealing strength decreases sharply at 110° C. to 130° C. When the battery temperature rises, gases are generated due to the volatilization of the electrolyte or the like, and the pressure inside the case rises at about 130° C. and the case begins to expand. However, in the battery using a case made of the above-described packaging material for a battery, the sealing strength decreases at 110° C. to 130° C., which is lower than the temperature at which the case begins to expand. For this reason, the sealed portion is detached to unseal the case, so that the gases are released gradually. Thus, the bursting or the ignition of the case is prevented.

In the battery packaging material as recited in the above-described Item [2], the ethylene-propylene copolymer of the sealant layer is a metallocene catalyst-derived copolymer. Therefore, the sealing strength can be reduced at a target temperature.

In the packaging material for a battery as recited in the above-described Item [3], the sealant layer is made of a propylene-based resin containing a predetermined amount of polyethylene. Therefore, the effect of decreasing the sealing strength at the target temperature is large.

In the packaging material for a battery as recited in the above-described Item [4], 70 mass % or more of the polyethylene in the propylene-based resin constituting the sealant layer is derived from a metallocene catalyst. Therefore, it is easily dispersed in the polypropylene, and the effect of controlling the temperature at which the sealing strength is decreased to the temperature as intended can be improved.

In the battery packaging material as recited in the above-described Item [5], the sealant layer is a multi-layer composed of a first sealant layer, a second sealant layer, and a third sealant layer. By configuring the third sealant layer by an ethylene-propylene random copolymer, a strong bonding force can be obtained for the barrier layer. By configuring the second sealant layer by a resin smaller in the melt flow rate than the ethylene-propylene copolymer of the first sealant layer and having a higher melting point, it is possible to cause the seal portion between the first sealant layers to unseal.

According to the battery case described in the above-described Item [6], the above-described effects by the packaging material for a battery can be obtained.

In the battery case as recited in the above-described Item [7], the sealing at the edge portion of the battery element chamber is unsealed to cause the unsealing of the case at 110° C. to 130° C.

According to the battery as recited in the above-described Item [8], the above-described effects of the packaging material for a battery can be obtained.

EMBODIMENTS FOR CARRYING OUT THE INVENTION

Figure 1:
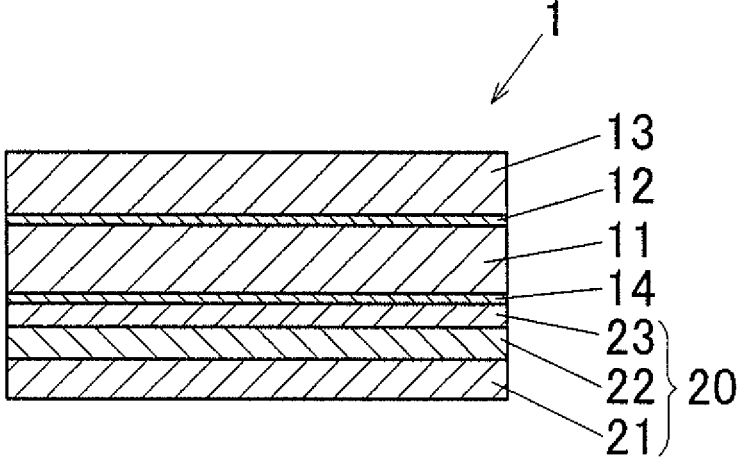
FIG. 1 is a cross-sectional view of one example of a packaging material for a battery according to the present invention.

FIG. 1 shows an embodiment of a packaging material for a battery according to the present invention.

[Packaging Material for Battery]

In the packaging material 1 for a battery, a base material layer 13 is bonded to one surface of a barrier layer 11 via a first adhesive layer 12, and a sealant layer 20 composed of a multi-layer is bonded to the other surface of the barrier layer 11 via a second adhesive layer 14. A pair of the battery packaging materials 1 are arranged with the sealant layers 20 facing to each other, and the peripheries of the battery packaging materials are heat-sealed. Thus, a battery case is produced. In the produced battery case, the base material layer 13 serves as the outer layer, and the sealant layer 20 serves as the inner layer.

[Sealant Layer of Packaging Material for Battery]

The packaging material for a battery according to the present invention is characterized by the material of the sealant layer serving the inner layer. The sealant layer has a function of providing excellent chemical resistance against electrolytes, etc., strong in the corrosiveness and giving a heat-sealing property to the laminate material. The sealant layer may be a single layer or a multi-layer. The materials of the first sealant layer serving as the innermost layer, i.e., layers that abut with each other during the heat-sealing of oppositely arranged packaging materials are defined as follows.

The illustrated sealant layer 20 has a three-layer structure in which the first sealant layer 21, the second sealant layer 22, and the third sealant layer 23 are laminated in this order from the inside of the packaging material 1 for a battery toward the barrier layer 11. The third sealant layer 23 is in contact with the second adhesive layer 14. The second sealant layer 22 is an intermediate layer arranged between the first sealant layer 21 and the third sealant layer 33.

The first sealant layer 21 is made of a resin containing an ethylene-propylene copolymer containing at least ethylene and propylene as copolymerization components, as a propylene-based resin.

The ethylene-propylene copolymer may be any of a random copolymer, a block copolymer, and a block copolymer, but is required to satisfy the following three conditions as essential characteristics.

(1) The ratio Mw/Mn of the weight average molecular weight (Mw) to the number average molecular weight Mn, measured by gel permeation chromatography (GPC), is 1 to 7. The preferred Mw/Mn is 1.2 to 3.5, more preferably from 1.5 to 2.8.

(2) The melt flow rate (MFR) measured at 230° C. and 2.16 kg load based on JIS K7210 id 5 g/10 min to 30 g/10 min. The preferred melt flow rate (MFR) is 5 g/10 min to 10 g/min.

(3) The melting point calculated by differential scanning calorimetry analysis is 120° C. to 135° C. The preferred melting point is 122° C. to 133° C.

In the ethylene-propylene copolymer satisfying the above-described three conditions, the sealing strength decreases at 110° C. to 130° C., resulting in easy unsealing, and the sealing strength at temperatures below that is maintained. When the battery temperature rises, gases are generated by due to volatilization of the electrolyte or the like, and at about 130° C., the pressure in the battery rises, causing the case to start expanding. The temperature range causing the decrease in the above-described sealing strength is higher than the expected operating temperature range of the battery and below the temperature at which inflation starts. Therefore, when the battery rapidly rises in the temperature and the internal pressure starts rising due to the generation of gases, the sealing is detached to cause the unsealing of the case. When the case is unsealed, the gases are gradually released, preventing the bursting or igniting of the case.

The ethylene-propylene copolymer satisfying the above-described three conditions can be obtained, for example, by copolymerizing ethylene and propylene, which are copolymerization components, by a metallocene catalyst. The metacellone catalyst-derived ethylene-propylene copolymer is high in the uniformity of the molecular weight and tends to satisfy the above-described three conditions, and has a large effect of lowering the sealing strength at a target temperature.

Further, the propylene-based resin is a mixture of an ethylene-propylene copolymer and polyethylene. The content of the polyethylene in the mixture is preferably 7 mass % to 20 mass %. By setting the polyethylene content to the above-described range, it is highly effective in reducing the sealing strength at a target temperature. A particularly preferred ethylene content rate is 10 mass % to 15 mass %. Further, preferably, 70 mass % or more of the polyethylene is a metallocene catalyst-derived polyethylene polymerized by a metallocene catalyst. The metallocene catalyst-derived polyethylene is easily dispersed in polypropylene to improve the effect of controlling the temperature at which the sealing strength is decreased to a target temperature. A particularly preferred content of the metacellone catalyst-derived polyethylene is 85 mass % or more.

It is preferable to add a lubricant or an anti-blocking agent to the first sealant layer 21.

The examples of the lubricant include, but not particularly limited thereto, saturated fatty acid amide, unsaturated fatty acid amide, substituted amide, methylolamide, saturated fatty acid bisamide, unsaturated fatty acid bisamide, fatty acid ester amide, and aromatic bisamide.

The examples of the saturated fatty acid amide include, but not particularly limited thereto, lauric acid amide, palmitic acid amide, stearic acid amide, behenic acid amide, and hydroxystearic acid amide.

The examples of the unsaturated fatty acid amide include, but not particularly limited thereto, oleic acid amide and erucic acid amide.

The examples of the substituted amide include, but not particularly limited thereto, N-oleylpalmitamide, N-stearyl-stearamide, N-stearyloleamide, N-oleylstearamide, N-stearylerucamide, and the like.

The examples of the methylol amide include, but not particularly limited thereto, methylol stearic acid amide and the like.

The examples of the saturated fatty acid bisamide include, but not particularly limited thereto, methylene bis stearic acid amide, ethylene bis capric acid amide, ethylene bis lauric acid amide, ethylene bis stearic acid amide, ethylene bis hydroxy stearic acid amide, ethylene bis behenic acid amide, hexamethylene bis stearic acid amide, hexamethylene bis behenic acid amide, hexamethylene hydroxy stearic acid amide, N, N'-distearyl adipic acid amide, N, N'-distearyl sebacic acid amide, and the like.

The examples of the unsaturated fatty acid bisamide include, but are not limited thereto, ethylene bis oleic acid amide, ethylene bis erucic acid amide, hexamethylene bis oleic acid amide, N, N'-dioleylsebacic acid amide, and the like.

The examples of the fatty acid ester amide include, but not particularly limited thereto, stearoamide ethyl stearate and the like.

The examples of the aromatic bisamide include, but not particularly limited thereto, m-xylylene bis stearic acid amide, m-xylylene bis hydroxystearic acid amide, and N, N'-distearyl isophthalic acid amide.

The lubricant concentration in the first sealant layer 21 is preferably in the range of 100 ppm to 3,000 ppm. When the lubricant concentration is less than 100 ppm, the formability is insufficient. When 3,000 ppm of the lubricant is added, the formability is sufficiently improved, and therefore a larger amount of addition exceeding 3,000 ppm is not preferable in terms of cost. The particularly preferable lubricant concentration is 500 ppm to 2,000 ppm.

The examples of the anti-blocking agent include, but not particularly limited thereto, particles, etc., of silica, acrylic resin, aluminum silicate, calcium carbonate, barium carbonate, titanium oxide, talc, kaolin, etc. The particle size of the anti-blocking agent is preferably in the range of 0.1 μm to 10 μm in the average particle diameter, and more preferably in the range of 1 μm to 5 μm in the average particle diameter. The concentration of the anti-blocking agent is preferably set to 100 ppm to 5,000 ppm. The particularly preferable concentration is 500 ppm to 4,000 ppm.

By containing the anti-blocking agent (particles) in the first sealant layer 21 of the sealant layer 20 of the packaging material 1 for a battery, microprojections are formed on the surface of the first sealant layer 21, which can reduce the contact area between films. As a result, the blocking between sealant films can be suppressed. Further, by containing the anti-blocking agent (particles) together with the lubricant, it is possible to further improve the slipperiness at the time of molding.

In a case where the sealant layer is a single layer, the sealant layer is composed of a single layer of the above-described first sealant layer 21.

In a case where the sealant layer 20 is a multi-layer, the preferred materials of the layers other than the first sealant layer 21 are as follows. Note that the present invention does not limit the materials of the layers other than the first sealant layer 21.

The material of the third, sealant layer 23 may be exemplified by an ethylene-propylene copolymer, an ethylene-propylene random copolymer of the same composition as the first sealant layer 21. Further, since the third sealant layer 23 is a layer for increasing the bonding force between the second adhesive layer 14 and the barrier layer 11 together with the sealant layer 20, the lubricant or the anti-blocking agent is not preferably added. However, from the viewpoint of stability during the film formation of the sealant layer 20 and the prevention of blocking after the forming of the sealant layer 20, an erucic acid amide of 1,000 ppm or less may be added as a lubricant, and silica particles of 2,000 ppm or less may be added as an anti-blocking agent.

The second sealant layer 22 is an intermediate layer between the first sealant layer 21 and the third sealant layer 23. The second sealant layer 22 may be a homopolymer of propylene or a copolymer containing a copolymerization component other than propylene and propylene in the copolymerization component. Further, the second sealant layer 22 may be a mixture of a plurality of kinds of polymers. Further, in the second sealant layer 22, when the same propylene-based resin as the first sealant layer 21 is mixed, the bonding properties between the second sealant layer 22 and the first sealant layer 21 is improved. Note that the second sealant layer 22 may be either a single layer or a multi-layer.

The illustrated sealant layer 20 has a three-layer structure and can be obtained by producing a multi-layer film by coextrusion or the like of the materials of the respective layers. Further, the sealant layer 20 is preferably a non-stretched film.

The thickness of the sealant layer 20 is preferably in the range of 20 μm to 100 μm, and more preferably in the range of 25 μm to 85 μm. In addition, in the sealant layer 20 of the illustrated three-layer structure (including the case in which the second sealant layer is a multi-layer), the preferable ratio of the thickness of each layer is: the first sealant layer 21:the second sealant layer 22:the third sealant layer 23=1 to 3:4 to 8:1 to 3.

In a case where the sealant layer 20 is a multi-layer, the sealant layer 20 is preferably designed such that the case is unsealed at the seal portion between the first sealant layers 21 of two heat-sealed packaging materials 1 for a battery. It is configured such that before the unsealing of the first sealant layers 21, the separation within the sealant layer 20 is prevented from occurring. If an interlayer separation occurs in the sealant layer 20, it may be difficult for the gases generated in a battery to escape under a high-temperature environment. Specifically, it is preferable to configure as follows. That is, the third sealant layer 23 is configured by an ethylene-propylene random copolymer. The second sealant layer 22 (in a case where the second sealant layer is a multi-layer, at least one layer of them) is made of a resin having a melt flow rate smaller than that of the ethylene-propylene copolymer of the first sealant layer 21 and a higher melting point. By configuring the third sealant layer 23 by an ethylene-propylene random copolymer, a strong bonding force can be obtained with respect to the barrier layer 11. Further, the preferable property of the material configuring the second sealant layer 22 is that the melt flow rate measured at 230° C. and 2.16 kg load based on JIS K7210 is 2 g/10 min to 7 g/10 min, and the melting point calculated by differential scanning calorimetry analysis is 120° C. to 165° C. The particularly preferred melt flow rate is 2 g/10 min to 5 g/10 min, and the particularly preferred melting point is 140° C. to 165° C. By setting the three layers of materials in this manner, the case is unsealed between the first sealant layers 21 of the sealant layers 20 of two battery packaging material sheets 1.

[Layers other than Sealant Layer of Packaging Material for Battery]

In the packaging material for a battery according to the present invention, in the layers other than the sealant layer, well-known materials can be appropriately used. Further, there is no particular limitation on the bonding method. Hereinafter, the preferred materials of the layers other than the sealant layer will be described.

(Base Material Layer)

As the base material layer 13, a heat-resistant resin film that is not melted at heat sealing temperatures at which the packaging material 1 for a battery is heat-sealed is used. As the heat-resistant resin, a heat-resistant resin having a melting point higher than the melting point of the resin configuring the sealant layer 20 by 10° C. or more, preferably 20° C. or more, is used. The examples of the resin satisfying this condition include a polyamide film and a polyester film such as a nylon film, and these stretched films are preferably used. Among these, a biaxially stretched polyamide film, a biaxially stretched polybutylene terephthalate (PBT) film, a biaxially stretched polyethylene terephthalate (PET) film, or a biaxially stretched polyethylene naphthalate (PEN) film, such as a biaxially stretched nylon film is particularly and preferably used as the base material layer 13. The example of the nylon film include, but not particularly limited thereto, a 6 nylon film, a 6, 6 nylon film, and an MXD nylon film. Note that the base material layer 13 may be formed as a single layer, or may be formed as a multi-layer (such as a multi-layer made of a PET film/nylon film) made of, for example, a polyester film/polyamide film.

The thickness of the base material layer 13 is preferably 7 μm to 50 μm. In this case, it is possible to secure a satisfactory strength as a packaging material, and it is possible to reduce stresses at the time of forming, such as, e.g., stretch forming, drawing, or the like, so it is possible to improve the formability. The more preferable thickness of the base material layer 13 is 9 μm to 30 μm.

(Barrier Layer)

The barrier layer 11 is responsible for providing the packaging material 1 for a battery with a gas barrier property for preventing oxygen/water from entering. The examples of the barrier layer 11 include, but not particularly limited thereto, a metal foil, such as, e.g., an aluminum foil, a SUS foil (stainless-steel foil), a copper foil, a nickel foil, a titanium foil, and a clad metal foil. The thickness of the barrier layer 11 is preferably 20 μm to 100 μm. In a case where it is 20 μm or more, it is possible to prevent the occurrence of pinholes during rolling for producing the metal foil. In a case where the thickness is 100 μm or less, the stress at the time of forming, such as, e.g., stretch forming and drawing, can be reduced to improve the formability. The particularly preferred thickness of the barrier layer 11 is 25 μm to 85 μm.

Further, the barrier layer 11 is preferably subjected to a base treatment, such as, e.g., a chemical conversion treatment, on at least a surface of the metal foil on the sealant layer 20 side. By being subjected to such a chemical conversion treatment, it is possible to sufficiently prevent the metal foil surface from being corroded by the contents (such as, the electrolytes of the battery).

(First Adhesive Layer)

The examples of the first adhesive layer 12 include, but not particularly limited thereto, an adhesive layer, etc., formed by a two-part curing type adhesive agent. The example of the two-part curing type adhesive agent includes a two-part curing type adhesive agent. This two-part curing type adhesive agent is composed of a first liquid (main agent) composed of 1 or 2 or more kinds of polyols selected from the group consisting of a polyurethane-based polyol, a polyester-based polyol, a polyether-based polyol, and a polyester urethane-based polyol, and a second liquid (curing agent) composed of isocyanate. The preferred two-part curing type adhesive agent is composed of a first liquid composed of 1 or 2 or more of polyols selected from the group consisting of polyester-based polyol and polyester urethane-based polyol and a second liquid (curing agent) composed of isocyanate. The preferred thickness of the first adhesive layer 12 is 2 μm to 5 μm.

(Second Adhesive Layer)

The examples of the second adhesive layer 14 is not particularly limited. As the second adhesive layer 14, an adhesive agent containing one or more of a polyurethane-based resin, an acryl-based resin, an epoxy-based resin, a polyolefin-based resin, an elastomer-based resin, a fluorine-based resin, and an acid-modified polypropylene resin can be recommended. Among these, an adhesive agent composed of a polyurethane composite resin having an acid-modified polyolefin as a main agent is preferable as the second adhesive layer 14. The preferred thickness of the second adhesive layer 14 is 2 μm to 5 μm.

Other Lamination Embodiment of Packaging Material for Battery

In the packaging material for a battery according to the present invention, the first adhesive layer and the second adhesive agent are not essential layers. That is, the base material layer may be directly bonded to the barrier layer and the sealant layer, and the sealant layer may be directly bonded to the barrier layer.

Further, in the packaging material for a battery according to the present invention, another layer may be formed on the outer side and/or the inner side (barrier layer side) of the base material layer, and the outer layer may be configured by a plurality of layers including the base material layer.

A protective layer or a matte coating layer can be exemplified as the layer formed on the outer side of the base material layer. These layers serve as the outermost layer of the packaging material for a battery to protect the base material layer, and they are effective for imparting a good slipperiness to the surface to enhance the formability.

As a material of the protective layer, a phenoxy-based resin, a urethane-based resin, an epoxy-based resin, an acryl-based resin, a polyolefin-based resin, a fluorine-based resin, or the like, can be recommended. Further, the afore-mentioned matte coating layer is configured by a resin composition in which a matting agent is blended into a resin. For this matte coating layer, the above-mentioned resin, and inorganic fine particles of silica, alumina, calcium oxide, calcium carbonate, calcium sulfate, or calcium silicate, and resin beads of acrylic beads, and the like, can be recommended, as the matting agent.

The aforementioned protective layer and the matte coating layer can be formed by applying a liquid in which the fluidity is adjusted with a solvent to a base material layer and drying it. Alternatively, the protective layer and the matte coating layer can also be formed by bonding it as a film to the base material layer.

As the layer formed on the inner inside of the base material layer, that is, the layer formed between the base material layer and the first adhesive layer (between the base material layer and the barrier layer when the first adhesive layer is not present), a colored layer can be exemplified. In a case where the base material layer is transparent, the layer formed in the interior thereof can be visually recognized through the base material layer. Thus, by forming a colored layer on the inside of the base material layer, a color (including an achromatic color) can be imparted to the appearance of the packaging material for a battery. Note that in the packaging material for a battery in which no colored layer is formed, the color of the metal foil constituting the barrier layer serves as the external color.

As the above-described colored layer, a cured film of a colored ink composition in which a color pigment is blended into a resin binder can be recommended. As the resin binder, a two-part curing type polyester urethane resin binder composed of a polyester resin as a main agent and a multifunctional isocyanate compound as a curing agent can be exemplified. Further, as the above-described color pigment, an inorganic pigment, such as, e.g., carbon black, calcium carbonate, titanium oxide, zinc oxide, iron oxide, and aluminum powder, and an organic pigment, such as, e.g., azo compound, phthalocyanine-based compound, and condensed polycyclic compound, can be exemplified.

[Battery Case and Battery]

Figure 2:
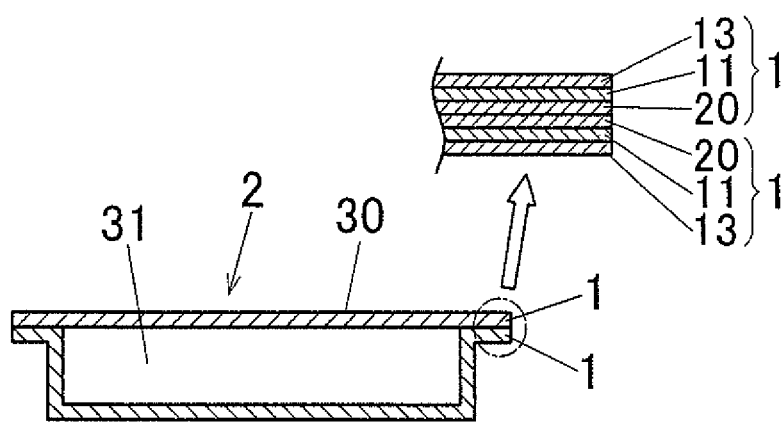
FIG. 2 is a cross-sectional view of a battery equipped with a battery case produced by the packaging material in FIG. 1.

The battery 2 of FIG. 2 is provided with a battery case 30 made of the packaging material for a battery according to the present invention.

The battery case 30 is produced by bringing the sealant layers 20 of the packaging materials 1 for a battery into contact with each other and heat-sealing the edges to form a battery element chamber 31 having the sealant layer 20 as an inner surface. Note that the partially enlarged view in FIG. 2 omits the illustrations of the first adhesive layer and the second adhesive layer of the packaging material 1 for a battery.

The battery 2 is produced by accommodating the battery elements including a positive electrode, a negative electrode, a separator and an electrolyte disposed between the positive electrode and the negative electrode, in the battery element chamber 31 of the battery case 30. In the battery 2, before reaching the temperature at which the gases are generated due to the battery elements, the sealing strength of the sealed portion between the sealant layers 20 decreases and the sealed portion is unsealed. With this, the gases are safely discharged out of the case without increasing the internal pressure. Thus, the bursting or ignition of the battery can be prevented.

The battery case 30 is required to maintain the sealing strength that does not cause unsealing of the case until the predetermined unsealing target temperature has reached even in a case where the battery temperature rises. In a case where the unsealing target temperature is 110° C. to 130° C., the desired sealing strength of the edge of the battery element chamber 31 is 60 N/15 mm or more at room temperature, 25 N/15 mm or more at 100° C., and 6 N/15 mm to 12 N/15 mm at 130° C. It is even more preferred if the sealing strength at 130° C. is 6 N/15 mm to 10 N/15 mm.

EXAMPLES

The sealant layers 20 and the packaging materials 1 for a battery having the three-layer structure as shown in FIG. 1 were prepared as Examples 1 to 7 and Comparative Examples 1 to 5.

In Examples 1 to 7 and Comparative Examples 1 to 5, only the material of the first sealant layer 21 of the sealant layer 20 was different, and the other materials were common. The materials of the barrier layer 11, the base material layer 13, the first adhesive layer 12, and the second adhesive layer 14 were as follows.

As the barrier layer 11, a chemical conversion coating film was formed in which a chemical conversion treatment solution was composed of polyacrylic acid (acryl-based resin), a chromium (III) salt compound, water, and alcohol, was applied to both surfaces of an aluminum foil made of A8079 having a thickness of 35 μm and then subjected to drying at 150° C. The chromium adhesion amount of this chemical conversion coating film was 5 mg/m² per side.

As the base material layer 13, a biaxially stretched 6 nylon film with a thickness of 25 μm was used.

As the first adhesive layer 12, a two-part curing type urethane-based adhesive agent was used.

As the second adhesive layer 14, a two-part curing type maleic acid-modified propylene adhesive agent was used.

(Preparation of Three-Layered Films for Sealant Layer)

A sealant layer 20 in which the first sealant layer 21, the second sealant layer 22, and the third sealant layer 23 were laminated was made by coextrusion.

The first sealant layer 21 was made of a resin composition in which 1,000 ppm of erucic acid amide as a lubricant and 2,000 ppm of silica particles as an anti-blocking agent were added to a mixture of an ethylene-propylene random copolymer and polyethylene. In the polymerization step of an ethylene-propylene random copolymer, the presence or absence of the use of a metallocene catalyst is as shown in Table 1. Further, Table 1 shows the ratio (Mw/Mn) of the weight average molecular weight (Mw) to the number average molecular weight (Mn) of the ethylene-propylene copolymer used in each Example (Mw/Mn), the melt flow rate (MFR) measured based on JIS K7210 (230° C./2.16 kg load), and the melting point (° C.) calculated by differential scanning calorimetry analysis. Further, the content of the polyethylene to the sum of an ethylene-propylene random copolymer and polyethylene and the content of metallocene catalyst-derived polyethylene in the polyethylene are as shown in Table 1.

The second sealant layer 22 was composed of a resin composition in which 2,500 ppm of erucic acid amide was added as a lubricant. to an ethylene-propylene block copolymer.

The third sealant layer 23 was composed of a resin .composition in which 1,000 ppm of erucic acid amide as a lubricant and 2,000 ppm of silica particles as an anti-blocking agent were added to an ethylene-propylene random copolymer.

The resin composition constituting the first sealant layer 21, the second sealant layer 22, and the third sealant layer 23 described above was coextruded, and films of the three-layer structure were extruded. The thickness of each layer was as follows. The thickness of the first sealant layer 21 was 6 μm, the thickness of the second sealant layer 22 was 28 μm, and the thickness of the third sealant layer 23 was 6 μm, and a sealant film having a total thickness of 40 μm was produced. Note that each layer of the sealant layer 20 was a non-stretched film.

Then, an adhesive agent was applied to one surface of the barrier layer 11 to form a first adhesive layer 12 having a thickness of 3 μm, and the base material layer 13 was dry-laminated. Further, on the other surface of the barrier layer 11, an adhesive agent was applied to form a second adhesive layer 14 having a thickness of 2 μm, and the third sealant layer 23 of the sealant layer 20 was combined and dry-laminated. The laminated sheet was then dry-laminated by sandwiching it between a rubber nip roll and a laminate roll heated to 100° C. and crimping. Thereafter, the packaging material 1 for a battery was obtained by aging (heated) at 40° C. for 10 days (see FIG. 1).

The sealing strength of the produced packaging material for a battery at three temperatures at room temperature (25° C.), 130° C., and 100° C. was evaluated by the following methods.

The test material for measuring the sealing strength was produced by heat-sealing two sheets of test pieces in which the packaging material 1 for a battery was cut to a width 15 mm×length 150 mm. The heat sealing was performed by facing the sealant layers 20 to each other toward the inside, using a heat-sealing device (Tester Industry Co., Ltd., TP-701-A), single-sided heating, under the conditions of: a heat-sealing temperature: 200° C., sealing pressure: 0.2 MPa (gauge display pressure), sealing time: 2 seconds.

(Room Temperature Strength)

The sealing strength was measured using AGS-5kNX produced by Shimadzu Access Co., Ltd. in accordance with JIS Z0238-1998, when a T-shaped separation was performed at a tensile rate of 100 mm/min between the sealant layers 20 of the sealed portion of the test material. This strength was a sealed strength (N/15 mm width).

The room temperature sealing temperature was measured by the separation strength in the manner described above with respect to the test materials at room temperature. The sealing strength at 130° C. and 100° C. was also measured by the separation strength in the manner described above under each temperature. environment after the test material was allowed to stand under each temperature environment for 24 hours. The sealing strength at each temperature is shown in Table 1.

TABLE 1

| | | | | | | | | | Polyethylene | | |
| | | | First sealant layer of the sealant layer (propylene-based resin) | | | | | | | | |
| | | | Ethylene-propylene random copolymer | | | | | Metallocene catalyst- | Sealing strength (N/15 mm) | | |
| | | Mw/Mn | MFR (g/10 min) | Melting point (° C.) | Metallocene catalyst | Content (mass %) | derived content (mass %) | Normal temperature | 130° C. | 100° C. |
|---|---|---|---|---|---|---|---|---|---|---|---|
| Ex. 1 | | 2 | 7 | 125 | Used | 10 | 80 | 65 | 8 | 25 |
| Ex. 2 | | 1.2 | 5 | 133 | Used | 10 | 70 | 72 | 10 | 28 |
| Ex. 3 | | 3.5 | 10 | 123 | Used | 14 | 70 | 70 | 7 | 25 |
| Ex. 4 | | 3 | 30 | 120 | Used | 15 | 95 | 64 | 6 | 25 |
| Ex. 5 | | 6 | 10 | 127 | Unused | 13 | 70 | 68 | 12 | 27 |
| Ex. 6 | | 5 | 21 | 124 | Used | 7 | 65 | 68 | 8 | 26 |
| Ex. 7 | | 7 | 15 | 134 | Used | 0 | 0 | 74 | 12 | 27 |
| Ccmp. Ex. 1 | | 10 | 7 | 130 | Unused | 10 | 80 | 68 | 15 | 25 |
| Comp. Ex. 2 | | 5 | 8 | 140 | Unused | 6 | 0 | 80 | 25 | 30 |
| Comp. Ex. 3 | | 12 | 35 | 105 | Unused | 20 | 20 | 40 | 4 | 5 |

TABLE 1-continued

| | First sealant layer of the sealant layer (propylene-based resin) | | | | | | | | |
| | Ethylene-propylene random copolymer | | | | Polyethylene | | Sealing strength (N/15 mm) | | |
| | | | | | | Metallo-cene catalyst- | | | |
| | Mw/Mn | MFR (g/10 min) | Melting point (° C.) | Metallo-cene catalyst | Content (mass %) | derived content (mass %) | Normal tempe-rature | 130° C. | 100° C. |
|---|---|---|---|---|---|---|---|---|---|
| Comp. Ex. 4 | 7 | 4 | 138 | Unused | 5 | 50 | 78 | 24 | 36 |
| Comp. Ex. 5 | 1 | 6 | 136 | Unused | 5 | 0 | 75 | 23 | 31 |

From Table 1, it was confirmed that the sealing strength can be decreased at the desired temperature by defining the characteristics of the outermost layer of the sealant layer.

This application claims priority to Japanese Patent Application No. 2020-139411, filed on Aug. 20, 2020, and Japanese Patent Application No. 2021-110499, filed on Jul. 2, 2021, the disclosures of which are incorporated herein by reference in their entirety.

It should be understood that the terms and phrases used herein are for the purpose of description and not of limitation, and do not exclude any equivalents of the features shown and described herein, and are intended to allow various modifications within the scope of the present invention claim.

INDUSTRIAL APPLICABILITY

The packaging material for a battery according to the present invention can be used as a case of a secondary battery for automobiles, a stationary second battery, a second battery for notebook computers, mobile phones, or cameras. The packaging material for a battery according to the present invention can be suitably and particularly used as a case for a small portable lithium-ion secondary battery.

DESCRIPTION OF SYMBOLS

1: Packaging material for battery
11: Barrier layer
12: First adhesive layer
13: Base material layer
14: Second adhesive layer
20: Sealant layer
21: First sealant layer
22: Second sealant layer
23: Third sealant layer

The invention claimed is:

1. A packaging material for a battery, comprising:
a base material layer as an outer layer;
a sealant layer as an inner layer; and
a barrier layer provided between the base material layer and the sealant layer,
wherein the sealant layer includes a first sealant layer serving as an innermost layer made of a propylene-based resin,
wherein the propylene-based resin is a mixture of an ethylene-propylene copolymer and polyethylene,
wherein in the ethylene-propylene copolymer,
a ratio Mw/Mn of a weight average molecular weight Mw to a number average molecular weight Mn, measured by a gel permeation chromatography (GPC), is 1 to 7,
a melt flow rate measured at 230° C. at a load of 2.16 kg based on JIS K7210 is 5 g/10 min to 30 g/10 min, and
a melting point calculated by a differential scanning calorimetry analysis is 120° C. to 133° C.,
wherein the ethylene-propylene copolymer is a metallocene catalyst-derived copolymer,
wherein a content of the polyethylene in the mixture is 7 mass % to 20 mass %,
wherein 65% or more and 95% or less by mass of polyethylene is polyethylene derived from a metallocene catalyst,
wherein the sealant layer is composed of a multi-layer in which the first sealant layer, a second sealant layer composed of one or more layers, and a third sealant layer are laminated in order from an inside of the packaging material toward a barrier layer side,
wherein the third sealant layer is made of an ethylene-propylene random copolymer,
wherein a melt flow rate of a resin constituting at least one layer of the second sealant layer is smaller than a melt flow rate of the ethylene-propylene copolymer of the first sealant layer, and
wherein the sealant layer is attached to the barrier layer via an adhesive layer.

2. The packaging material for a battery as recited in claim 1,
wherein 70 mass % or more of the polyethylene is metallocene catalyst-derived polyethylene.

3. The packaging material for a battery as recited in claim 1,
wherein the adhesive layer is directly adhered to the third sealant layer and to the barrier layer.

4. A battery case comprising:
a pair of the packaging materials as recited in any of claim 1 or 2,
wherein the packaging materials are arranged with sealant layer sides thereof facing inward and edge portions of the packaging materials are heat-sealed to form a battery element chamber for accommodating a battery element.

5. The battery case as recited in claim 4,
wherein a sealing strength of an edge portion of the battery element chamber is 60 N/15 mm or more at room temperature, 25 N/15 mm or more at 100° C., and 6 N/15 mm to 10 N/15 mm at 130° C.

6. The battery case as recited in claim 4,
wherein a sealing strength of an edge portion of the battery element chamber is 6 N/15 mm to 10 N/15 mm at 130° C.

7. A battery comprising:
the battery case as recited in claim 6; and
a battery element accommodated in the battery element chamber of the battery case.

8. A battery case comprising:
a first packaging material comprising the packaging material as recited in claim 1; and
a second packaging material comprising at least a first sealant layer that is identical to the first sealant layer of the first packaging material,
wherein the first sealant layer of the second packaging material and the first sealant layer of the second packaging material are bonded together.

9. The battery case as recited in claim 8, wherein
the second packaging material comprising the packaging material as recited in claim 1.

10. A packaging material for a battery, comprising:
a base material layer as an outer layer;
a sealant layer as an inner layer; and
a barrier layer provided between the base material layer and the sealant layer,
wherein the sealant layer includes a first sealant layer serving as an innermost layer made of a propylene-based resin,
wherein the propylene-based resin is a mixture of an ethylene-propylene copolymer and polyethylene,
wherein the ethylene-propylene copolymer is a metallocene catalyst-derived copolymer,
wherein a content of the polyethylene in the mixture is 7 mass % to 20 mass %, and
wherein 65% or more and 95% or less by mass of polyethylene is polyethylene derived from a metallocene catalyst.

* * * * *